(12) United States Patent
Lai

(10) Patent No.: US 8,608,205 B2
(45) Date of Patent: Dec. 17, 2013

(54) FLUID PIPE CONNECTION DEVICE

(76) Inventor: Lin Wai Lai, Hong Kong (CN)

(*) Notice: Subject to any disclaimer, the term of this patent is extended or adjusted under 35 U.S.C. 154(b) by 208 days.

(21) Appl. No.: 13/003,670

(22) PCT Filed: Jul. 8, 2009

(86) PCT No.: PCT/CN2009/000775
§ 371 (c)(1),
(2), (4) Date: Jan. 11, 2011

(87) PCT Pub. No.: WO2010/003314
PCT Pub. Date: Jan. 14, 2010

(65) Prior Publication Data
US 2011/0101685 A1    May 5, 2011

(30) Foreign Application Priority Data
Jul. 11, 2008 (CN) .................. 2008 1 0133606

(51) Int. Cl.
*F16L 35/00*    (2006.01)
(52) U.S. Cl.
USPC ............. 285/39; 285/307; 285/308; 285/340
(58) Field of Classification Search
USPC .................. 285/39, 243, 322, 339–340, 342, 285/307–308, 319, 345
See application file for complete search history.

(56) References Cited

U.S. PATENT DOCUMENTS

| | | | | |
|---|---|---|---|---|
| 2,635,901 A * | 4/1953 | Osborn | ........................... | 285/33 |
| 4,021,062 A | 5/1977 | Mariaulle | | |
| 4,123,090 A * | 10/1978 | Kotsakis et al. | ................ | 285/39 |
| 4,593,943 A * | 6/1986 | Hama et al. | .................... | 285/308 |
| 4,747,626 A * | 5/1988 | Hama et al. | .................... | 285/308 |
| 4,890,865 A * | 1/1990 | Hosono et al. | ........... | 285/123.15 |
| 5,292,157 A * | 3/1994 | Rubichon | ....................... | 285/39 |
| 5,681,058 A * | 10/1997 | Hwang | ...................... | 285/133.4 |
| 6,612,623 B2 * | 9/2003 | Salomon-Bahls | ............ | 285/308 |
| 7,195,287 B2 * | 3/2007 | Wai | ............................... | 285/340 |
| 2003/0057701 A1 * | 3/2003 | Koo | .............................. | 285/307 |
| 2005/0077723 A1 | 4/2005 | Wai | | |

FOREIGN PATENT DOCUMENTS

CN    1607349 A    4/2005
CN    2881274 Y    3/2007

* cited by examiner

*Primary Examiner* — Aaron Dunwoody
*Assistant Examiner* — Fannie Kee
(74) *Attorney, Agent, or Firm* — Lerner, David, Littenberg, Krumholz & Mentlik, LLP

(57) ABSTRACT

A fluid pipe connection device includes a plug sleeve fixedly fastened and mounted on a pipe joint used for mounting an internal tooth snap ring and a push tooth ring in the pipe joint and the plug sleeve. The internal tooth snap ring clamps the pipe wall after the pipe passes through the plug sleeve, the push tooth ring and the internal tooth snap ring. The push tooth ring pushes away internal teeth along the pipe insertion direction so as to lead the internal tooth snap ring to release the pipe wall before disassembling a pipe. A top end of the push tooth ring is basically flush with an exposed element or contracted in the exposed element under the pipe connection state. The exposed element is the more prominent one of the plug sleeve and the pipe joint. Also provided is a pipe disassembly tool.

18 Claims, 5 Drawing Sheets

FLUID PIPE CONNECTION DEVICE

FIELD OF INVENTION

The invention relates to a fluid pipe connection device and a pipe disassembly tool matched therewith.

CROSS-REFERENCE TO RELATED APPLICATIONS

The present application is a national phase entry under 35 U.S.C. §371 of International Application No. PCT/CN2009/000775 filed Jul. 8, 2009, published in Chinese, which claims priority from Chinese Application No. 200810133606.7 filed Jul. 11, 2008, all of which are incorporated herein by reference.

BACKGROUND OF THE INVENTION

The Chinese patent 200310101202.7, which is authorized announcement No. CN1324258C, (hereinafter referred to as a reference document), records a fluid pipe connection device for guiding the flow of water or gas and other fluids (called as a water or gas pipe connection device in the reference document), which includes a pipe joint and a plug sleeve which can be fixedly fastened and mounted on the pipe joint, and the plug sleeve is sheathed outside the pipe wall after a pipe passes through the plug sleeve. An internal tooth snap ring (called as an internal tooth locking ring 3 in the reference document) and a push tooth ring (called as an opening and closing ring 2 in the reference document) are mounted in the pipe joint and the plug sleeve. When in connection, the pipe passes through the plug sleeve and the push tooth ring, then extrudes away internal teeth outwards, then passes through the internal tooth snap ring and is connected on the pipe joint; if the pipe is a plastic pipe with the soft texture, the front ends of the internal teeth are slightly embedded in the pipe wall after completing the connection; if the pipe is an iron pipe or a stainless steel pipe, a groove can be formed on the pipe wall for clamping the front ends of the internal teeth in the pipe groove; if the pipe is a copper pipe, the groove does not need to be formed. When in retreat, the rear part of the internal teeth needs to be pushed away by the push tooth ring along the pipe insertion direction, thereby leading the front ends of the internal teeth to release the pipe wall and then taking out the pipe.

A thread is adopted between the outer wall of the push tooth ring and the inner wall of the plug sleeve in the reference document for connection, and a concave position is formed at the top part of the push tooth ring. When the pipe is being disassembled, a special hook spanner is used for hooking the concave position to rotate along a pipe shaft so as to lead the push tooth ring to push away the internal teeth of the internal tooth snap ring, and the pipe rotates in the reverse direction after the retreat so as to lead the push tooth ring to retreat and return the internal teeth to the original position. The adoption of a threaded connection structure between the push tooth ring and the plug sleeve has two defects: 1) when the pipe is being disassembled, the hook spanner needs to be used for hooking the concave position of the push tooth ring to rotate in the forward direction so as to disassemble the pipe, and then the rotation in the reverse direction needs to be carried out for resetting, thereby being troublesome to operate; and 2) in order to lead the to top part of the push tooth ring to be still hooked by the hook spanner when leading the push tooth ring to go into the plug sleeve and further push the internal teeth, the top part of the push tooth ring is required to be always significantly protrudent out of the plug sleeve during the long-term using process before disassembling the pipe, and the top part of the push tooth ring is easily worn and damaged due to collision, so that the disassembly of the pipe can not be smoothly carried out.

SUMMARY OF THE INVENTION

The invention aims at solving the problem of troublesome operation of pipe disassembly and simultaneously solving the problem that the top part of the push tooth ring is easily worn and damaged due to collision.

The invention provides a fluid pipe connection device, which includes a pipe joint, a plug sleeve which is fixedly fastened and mounted on the pipe joint is used for mounting an internal tooth snap ring and a push tooth ring in the pipe joint and the plug sleeve; when a pipe is being connected, the internal tooth snap ring clamps the pipe wall after the pipe passes through the plug sleeve, the push tooth ring and the internal tooth snap ring; the push tooth ring pushes away internal teeth along the pipe insertion direction so as to lead the internal tooth snap ring to release the pipe wall before disassembling a pipe; the push tooth ring is in sliding contact with the plug sleeve; and the fluid pipe connection device is characterized in that the top end of the push tooth ring is basically flush with an exposed element or contracted in the exposed element under the pipe connection state, and when the internal teeth are pushed away by the push tooth ring, the top end of the push tooth ring is contracted in the exposed element. The exposed element is the more prominent one of the plug sleeve and the pipe joint.

The invention further provides a pipe disassembly tool matched with the fluid pipe connection device of the invention, characterized by including a handle, and the handle is connected with an ejector block which can insert into the position between the exposed element and the pipe wall for pushing the push tooth ring.

As the push tooth ring is in sliding contact with the plug sleeve, the internal teeth can be pushed away by only leading the push tooth ring to carry out axial translation during the pipe disassembly, thereby eliminating the trouble of rotating the push tooth ring; the internal teeth are still in the deformation state after being pushed away by the push tooth ring after taking out the pipe; once the push tooth ring is released by a user, the deformation elastic force of the internal teeth can push the push tooth ring back to the original position, and the internal teeth can be automatically reset. In the reference document, due to the adoption of the threaded connection, the hook spanner needs to be firstly used for clamping the concave position of the push tooth ring to rotate when disassembling the pipe, and then the internal teeth can be pushed away from the pipe wall so as to disassemble the pipe; and the hook spanner needs to rotate in the reverse direction after the retreat of the pipe, and then the push tooth ring can retreat and the internal teeth can be further returned to the original position, while the internal teeth can not be reset automatically. The operation of the invention is more convenient by comparison. The top end of the push tooth ring of the fluid pipe connection device is basically flush with the exposed element or contracted in the exposed element under the pipe connection state, and the top part of the push tooth ring is not exposed, so that the push tooth ring can not be easily worn and damaged due to collision.

In order to be matched with the fluid pipe connection device of the invention, the pipe disassembly tool provided by the invention is provided with an ejector block which can insert into the position between the exposed element and the pipe wall for ejecting the push tooth ring till pushing away the internal teeth and further leading the internal tooth snap ring to release the pipe wall, thereby taking out the pipe.

DETAILED DESCRIPTION OF THE INVENTION

Figure 1:
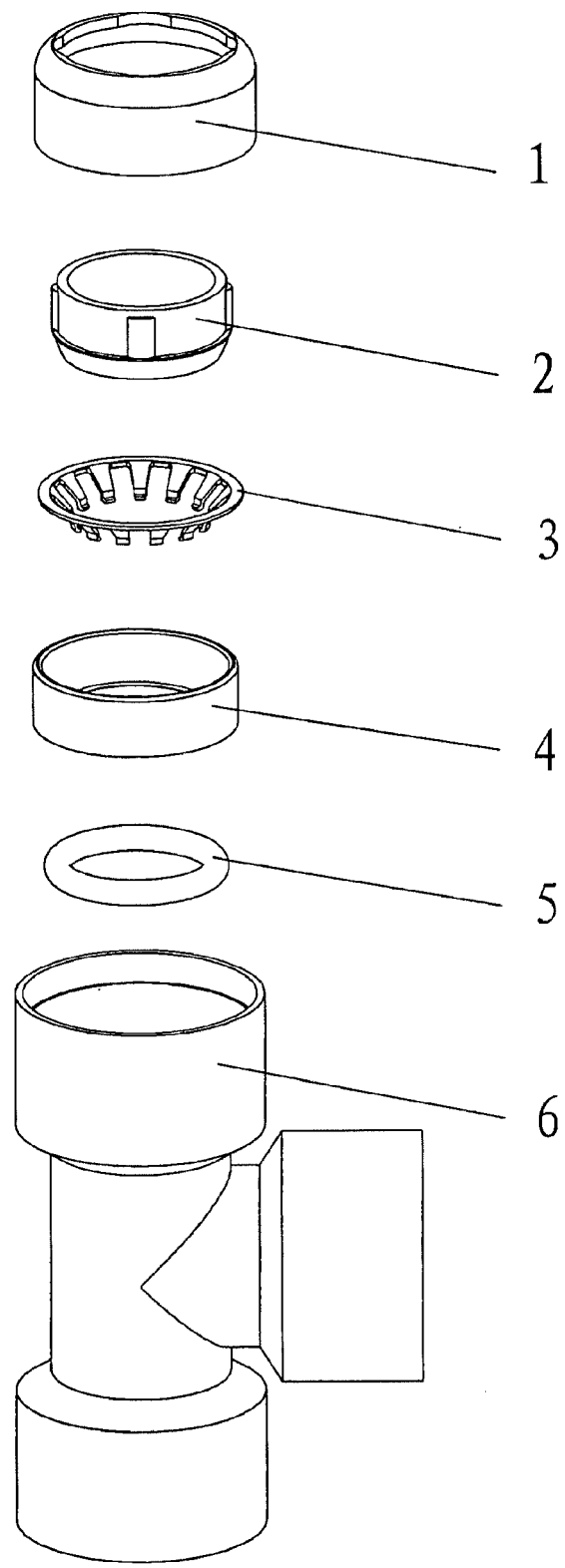
FIG. 1 is a three-dimensional exploded view of an external sealing type fluid pipe connection device.
Figure 2:
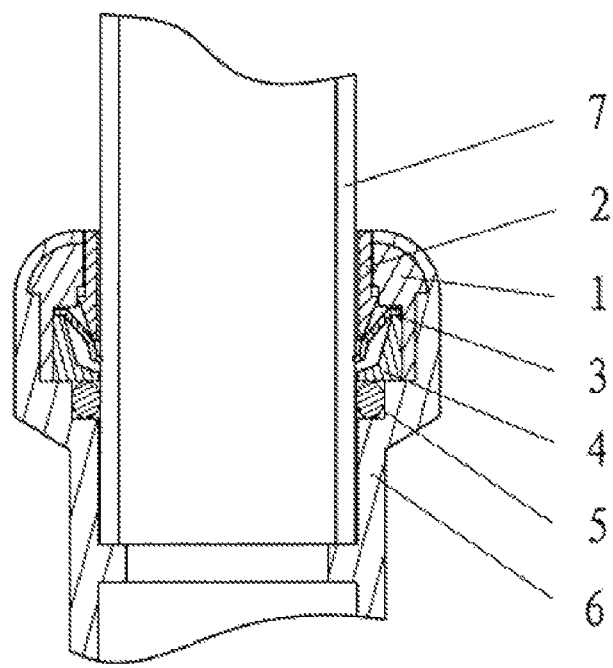
FIG. 2 is an assembly view of the external sealing type fluid pipe connection device.

FIGS. 1 and 2 show an external sealing type fluid pipe connection device which includes a plug sleeve 1, a push tooth ring 2, an internal tooth snap ring 3, a bearing ring 4, a sealing ring 5 and a pipe joint 6. The plug sleeve 1 is placed in the pipe joint 6 and compressed by using a tool or fixedly fastened in other ways, thereby wrapping the push tooth ring 2, the internal tooth snap ring 3, the bearing ring 4, the sealing ring 5 and other parts in the pipe joint 6 and the plug sleeve 1. The internal tooth snap ring 3 is placed on the bearing ring 4, and the sealing ring 5 is arranged below the bearing ring 4. The push tooth ring 2 is in sliding fit with the plug sleeve 1. A top end of the push tooth ring 2 is basically flush with the pipe joint 6 under the pipe connection state as shown in FIG. 2. The top end of the push tooth ring 2 can also be contracted in the pipe joint 6. The pipe joint 6 is an exposed element in this embodiment of the invention.

Figure 3:
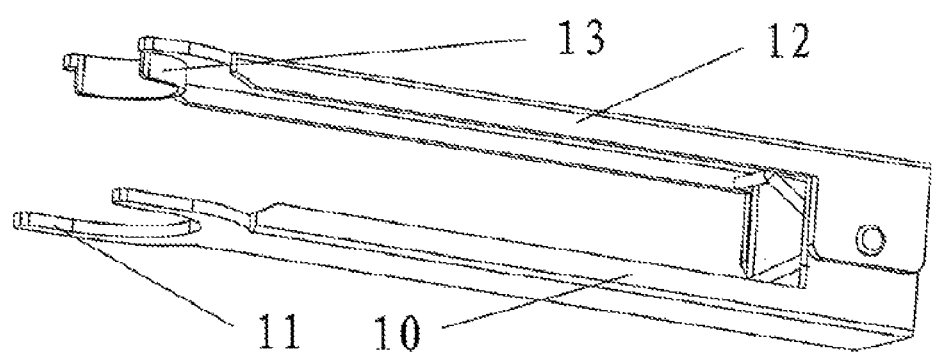
FIG. 3 is a schematic view of a first pipe disassembly tool.

A first pipe disassembly tool as shown in FIG. 3 is provided with a fixed handle 10 for being connected with a clamping part 11, and provided with a movable handle 12 for being connected with an ejector block 13, while the movable handle 12 is hinged with the fixed handle 10 at their rear parts. When a pipe is being disassembled, the clamping part 11 is firstly used for clamping the pipe joint 6, then the ejector block 13 is extended by pointing at the top end of the push tooth ring 2, and the middle-rear parts of the two handles are further tightly held for leading the movable handle 12 to approach the fixed handle 10, thereby leading the ejector block 13 to eject the push tooth ring 2 till pushing away internal teeth, and further leading the internal tooth snap ring 3 to release the pipe wall 7. As the pipe disassembly tool only needs to be operated by a single hand, the other hand can be used for taking out the pipe. Then the pipe disassembly tool is released, the push tooth ring 2 is pushed back to the original position due to the deformation elastic force of the internal teeth, and the internal teeth can also be reset automatically. Although the movable handle 12 and the fixed handle 10 of the pipe disassembly tool adopt the simple and convenient-to-operate hinge way, the two handles are in rotation rather than translation; however, as the pipe axial displacement of the push tooth ring 2 is very short, when the movable handle 12 approaches the fixed handle 10 by rotation, the pipe axial component of the displacement of the ejector block 13 is sufficient to eject the push tooth ring 2 till pushing away the internal teeth.

The movable handle 12 of the pipe disassembly tool can also be not connected with the fixed handle 10; and the pipe disassembly can also be not provided with the clamping part 11 and the fixed handle 10, while the pipe joint 6 is directly grabbed by the hand. But then the operation is difficult to complete by single hand.

The ejector block 13 of the pipe disassembly tool can also be longer, and the longer part can be used as the movable handle 12.

Figure 4:
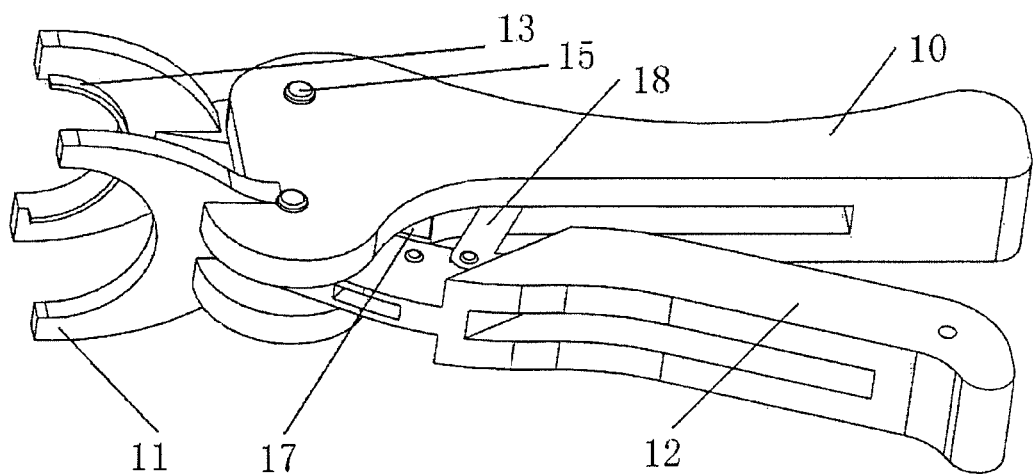
FIG. 4 is a schematic view of a second pipe disassembly tool.
Figure 5:
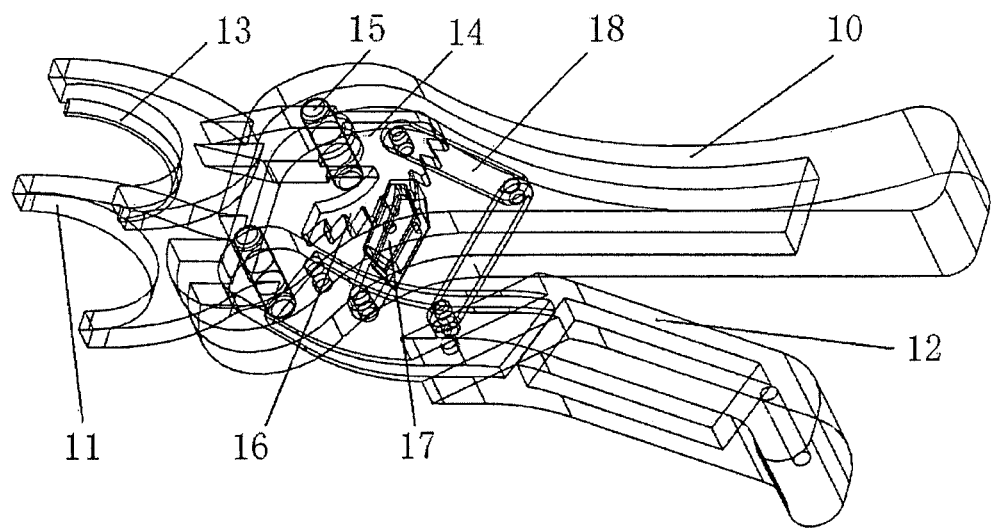
FIG. 5 is a perspective view of the second pipe disassembly tool.

A second pipe disassembly tool is shown in FIGS. 4 and 5, the clamping part 11 is connected on the fixed handle 10, the movable handle 12 is hinged with the fixed handle 10, the movable handle 12 is positioned behind the clamping part 11, the fixed handle 10 is positioned behind the ejector block 13, and the connection way between the ejector block 13 and the movable handle 12 is as follows:

a lever is arranged, a fulcrum 15 thereof is hinged with the fixed handle 10, the ejector block 13 is connected before the fulcrum 15, and the rear part 14 of the lever is arranged behind the fulcrum 15;

a push rod 17 is connected on the movable handle 12, when the movable handle 12 is approaching to the rear part 14 of the lever, the push rod 17 pushes the rear part 14 of the lever so as to lead the ejector block 13 to approach the clamping part 11;

two connecting rods 18 which are connected with a rear part 14 of the lever and the movable handle 12 are further arranged, when the movable handle 12 is far away from the rear part 14 of the lever, the two connecting rods 18 pull the rear part 14 of the lever so as to lead the ejector block 13 to be far away from the clamping part 11 and simultaneously lead the push rod 17 to retreat. The pipe disassembly tool can be operated by single hand.

A plurality of external teeth 16 are arranged at the rear part 14 of the lever as shown in FIG. 5, the push rod 17 is hinged with the movable handle 12, and the push rod 17 can select one of the external teeth 16 for pushing against so as to control the stroke of the ejector block 13. The push rod 17 can eject different external teeth 16, and then the stroke of the ejector block 13 is different, thereby playing the role of regulating the stroke.

Figure 6:
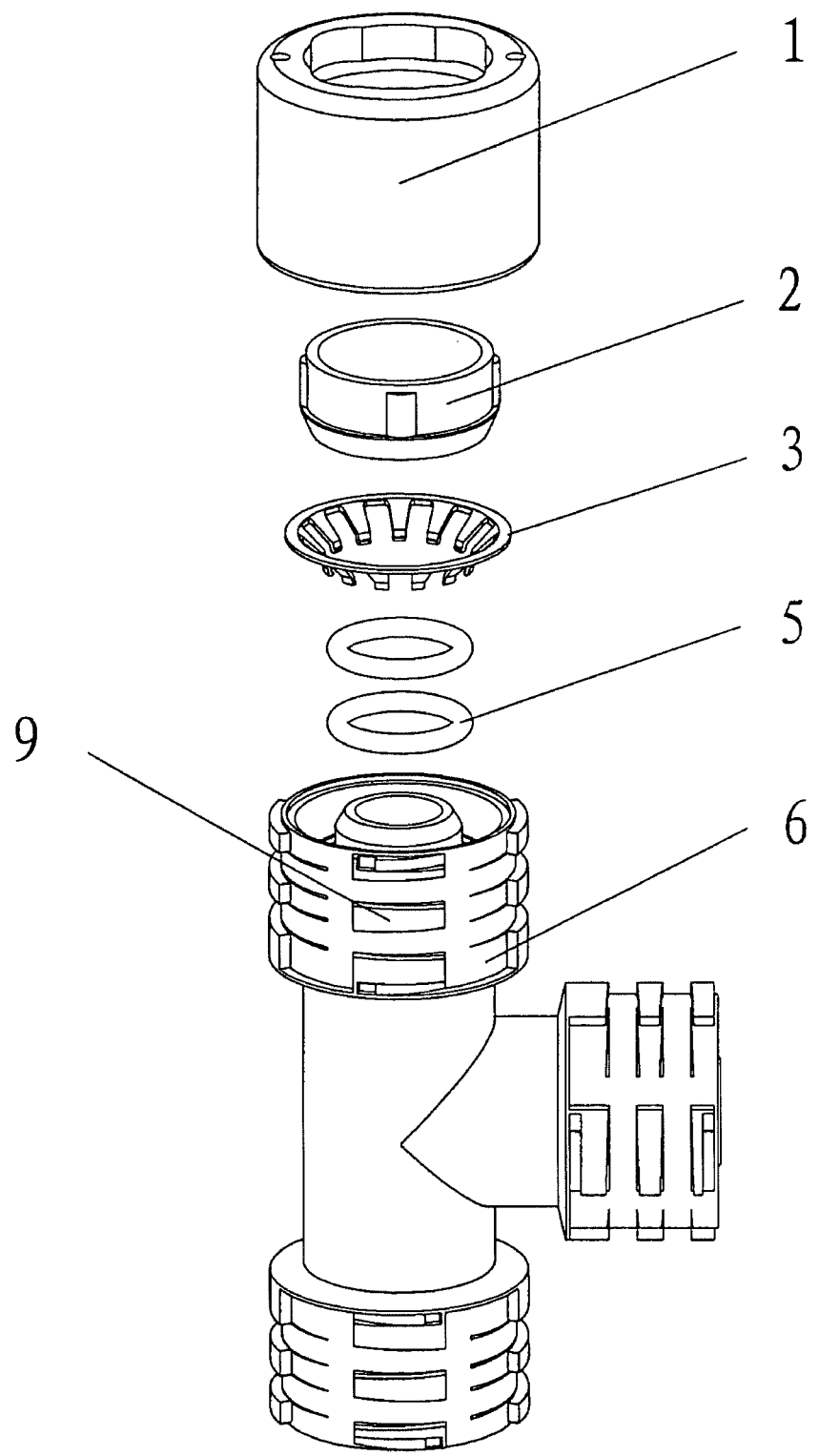
FIG. 6 is a three-dimensional exploded view of an internal sealing type fluid pipe connection device.
Figure 7:
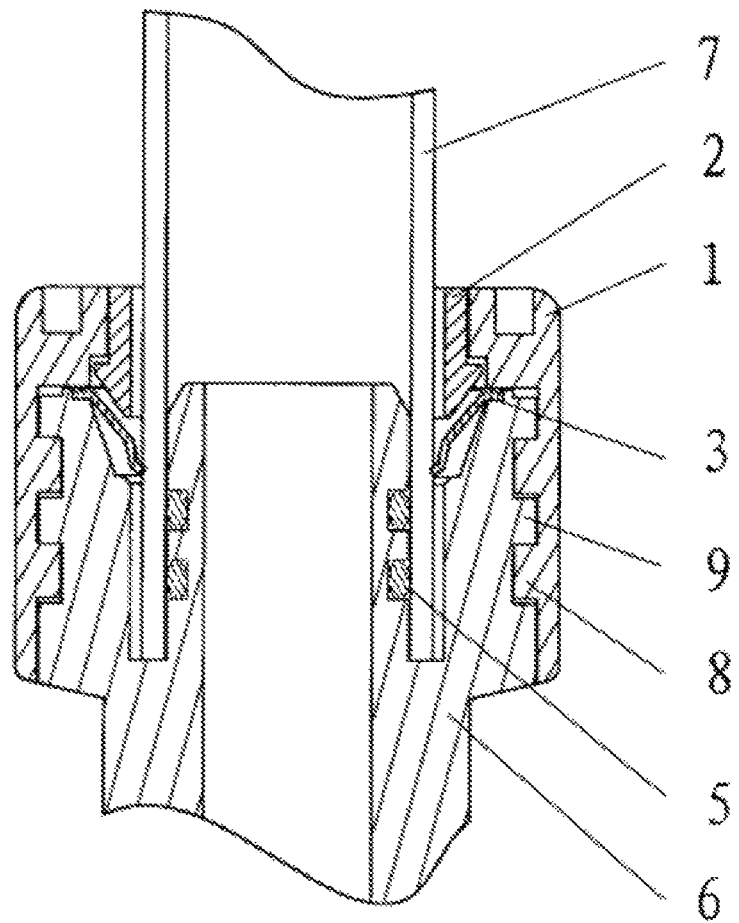
FIG. 7 is an assembly view of the internal sealing type fluid pipe connection device.

FIGS. 6 and 7 show an internal sealing type pipe connection device which includes a plug sleeve 1, a push tooth ring 2, an internal tooth snap ring 3, a sealing ring 5 and a pipe joint 6. Convex blocks 8 and 9 which are matched with each other are arranged on the outer wall of the pipe joint 6 and the inner wall of the plug sleeve 1, when assembly, the convex blocks 8 of the plug sleeve 1 is staggered with the convex blocks 9 of the pipe joint for inserting, then the plug sleeve 1 is rotated to lead the convex blocks 8 and 9 to push against each other for fastening fixedly, and other ways can also be used for fastening fixedly, thereby wrapping the internal tooth snap ring 3, the push tooth ring 2, the sealing ring 5 and other parts in the pipe joint 6 and the plug sleeve 1. The push tooth ring 2 is in sliding contact with the plug sleeve 1. A top end of the push tooth ring 2 is basically flush with the plug sleeve 1 under the pipe connection state as shown in FIG. 7. As the internal tooth snap ring 3 is directly placed on the pipe, the bearing ring 4 does not need to be arranged. The plug sleeve 1 is an exposed element in this embodiment of the invention.

What is claimed is:
1. A kit comprising:
   a fluid pipe connection device including:
      a pipe joint;
      a plug sleeve fixedly fastened and mounted to the pipe joint;
      an internal tooth snap ring at least partially disposed within the pipe joint and the plug sleeve; and
      a push tooth ring at least partially disposed within the pipe joint and the plug sleeve;

wherein when a pipe is being connected with the fluid pipe connection device into a pipe connection state, the internal tooth snap ring clamps a wall of the pipe after the pipe passes through the plug sleeve, the push tooth ring, and the internal tooth snap ring;

wherein the push tooth ring is configured to push away internal teeth of the internal tooth snap ring so as to lead the internal tooth snap ring to release the pipe wall before the pipe is disassembled;

wherein the push tooth ring is in sliding contact with the plug sleeve;

wherein an exposed end of the push tooth ring is substantially flush with an exposed element or contracted in the exposed element in the pipe connection state, and when the internal teeth are pushed away by the push tooth ring, the exposed end of the push tooth ring is contracted in the exposed element;

wherein the exposed element is one of the plug sleeve and the pipe joint; and a pipe disassembly tool matched with the fluid pipe connection device, the tool including:

a handle connected with an ejector block which can be inserted into a position between the exposed element and the pipe wall for pushing the push tooth ring; and a clamping part which can clamp the pipe joint and a fixed handle for connecting the clamping part;

wherein the handle connected with the ejector block is hinged with the fixed handle as a movable handle;

wherein the movable handle is positioned behind the clamping part, the fixed handle is positioned behind the ejector block, and a connection way between the ejector block and the movable handle is as follows:

a lever is arranged, a fulcrum thereof is hinged with the fixed handle, the ejector block is connected before the fulcrum, and a rear part of the lever is arranged behind the fulcrum;

a push rod is connected on the movable handle, when the movable handle is approaching the rear part of the lever, the push rod pushes the rear part of the lever so as to lead the ejector block to approach the clamping part; and two connecting rods which are connected with the rear part of the lever and the movable handle are further arranged, when the movable handle is far away from the rear part of the lever, the two connecting rods pull the rear part of the lever so as to lead the ejector block to be far away from the clamping part and simultaneously lead the push rod to retreat.

2. The pipe disassembly tool according to claim 1, wherein a plurality of external teeth are arranged at the rear part of the lever, the push rod is hinged with the movable handle, and the push rod can select one of the plurality of external teeth for pushing against so as to control a stroke of the ejector block.

3. A kit comprising:
a fluid pipe connection device including:
a pipe joint;
a plug sleeve mounted to the pipe joint;
an internal tooth snap ring at least partially disposed within the pipe joint or the plug sleeve; and
a push tooth ring at least partially disposed within the pipe joint or the plug sleeve;
wherein when a pipe is being connected with the fluid pipe connection device into a pipe connection state, the internal tooth snap ring clamps a wall of the pipe after the pipe passes through the internal tooth snap ring;

wherein the push tooth ring is configured to push away internal teeth of the internal tooth snap ring so as to lead the internal tooth snap ring to release the pipe wall before the pipe is disassembled;

wherein when the internal teeth are pushed away by the push tooth ring, an exposed end of the push tooth ring is contracted in an exposed element, the exposed element being one of the plug sleeve and the pipe joint; and a pipe disassembly tool matched with the fluid pipe connection device, the tool including:
an ejector block which can be inserted into a position between the exposed element and the pipe wall for pushing the push tooth ring;
a clamping part which can clamp the pipe joint;
a fixed handle connected with the clamping part; and
a movable handle connected with the ejector block and hinged with the fixed handle;
wherein the movable handle is positioned behind the clamping part and the fixed handle is positioned behind the ejector block;
wherein a connection way between the ejector block and the movable handle includes:
a lever, a fulcrum thereof hinged with the fixed handle, the ejector block connected before the fulcrum, and a rear part of the lever arranged behind the fulcrum; and
a push rod connected on the movable handle, when the movable handle is approaching the rear part of the lever, the push rod pushes the rear part of the lever so as to lead the ejector block to approach the clamping part.

4. The kit according to claim 3, wherein the connection way between the ejector block and the movable handle further includes two connecting rods connected with the rear part of the lever and the movable handle.

5. The kit according to claim 4, wherein when the movable handle is far away from the rear part of the lever, the two connecting rods pull the rear part of the lever so as to lead the ejector block to be far away from the clamping part and simultaneously lead the push rod to retreat.

6. The kit according to claim 5, wherein a plurality of external teeth are arranged at the rear part of the lever and the push rod is hinged with the movable handle.

7. The kit according to claim 6, wherein the push rod can be used to select one of the plurality of external teeth for pushing against so as to control a stroke of the ejector block.

8. The kit according to claim 4, wherein a plurality of external teeth are arranged at the rear part of the lever and the push rod is hinged with the movable handle.

9. The kit according to claim 8, wherein the push rod can be used to select one of the plurality of external teeth for pushing against so as to control a stroke of the ejector block.

10. The kit according to claim 3, wherein the push tooth ring is in sliding contact with the plug sleeve.

11. The kit according to claim 3, wherein the exposed end of the push tooth ring is substantially flush with the exposed element or contracted in the exposed element in the pipe connection state.

12. A pipe disassembly tool for use with a fluid pipe connection device, the fluid pipe connection device including a pipe joint, a plug sleeve mounted to the pipe joint, an internal tooth snap ring at least partially disposed within the pipe joint or the plug sleeve, and a push tooth ring at least partially disposed within the pipe joint or the plug sleeve, wherein when a pipe is being connected with the fluid pipe connection device into a pipe connection state, the internal tooth snap ring clamps a wall of the pipe after the pipe passes through the internal tooth snap ring, wherein the push tooth ring is configured to push away internal teeth of the internal tooth snap ring so as to lead the internal tooth snap ring to release the pipe wall before the pipe is disassembled, and wherein when the internal teeth are pushed away by the push tooth ring, an exposed end of the push tooth ring is contracted in an exposed element, the exposed element being one of the plug sleeve and the pipe joint, the pipe disassembly tool comprising:
- an ejector block which can be inserted into a position between the exposed element and the pipe wall for pushing the push tooth ring;
- a clamping part which can clamp the pipe joint;
- a fixed handle connected with the clamping part; and
- a movable handle connected with the ejector block and hinged with the fixed handle;
- wherein the movable handle is positioned behind the clamping part and the fixed handle is positioned behind the ejector block;
- wherein a connection way between the ejector block and the movable handle includes:
  - a lever, a fulcrum thereof hinged with the fixed handle, the ejector block connected before the fulcrum, and a rear part of the lever arranged behind the fulcrum; and
  - a push rod connected on the movable handle, when the movable handle is approaching the rear part of the lever, the push rod pushes the rear part of the lever so as to lead the ejector block to approach the clamping part.

13. The pipe disassembly tool according to claim 12, wherein the connection way between the ejector block and the movable handle further includes two connecting rods connected with the rear part of the lever and the movable handle.

14. The pipe disassembly tool according to claim 13, wherein when the movable handle is far away from the rear part of the lever, the two connecting rods pull the rear part of the lever so as to lead the ejector block to be far away from the clamping part and simultaneously lead the push rod to retreat.

15. The pipe disassembly tool according to claim 14, wherein a plurality of external teeth are arranged at the rear part of the lever and the push rod is hinged with the movable handle.

16. The pipe disassembly tool according to claim 15, wherein the push rod can be used to select one of the plurality of external teeth for pushing against so as to control a stroke of the ejector block.

17. The pipe disassembly tool according to claim 13, wherein a plurality of external teeth are arranged at the rear part of the lever and the push rod is hinged with the movable handle.

18. The pipe disassembly tool according to claim 17, wherein the push rod can be used to select one of the plurality of external teeth for pushing against so as to control a stroke of the ejector block.

\* \* \* \* \*